United States Patent

Goldsmith et al.

Patent Number: 5,775,592
Date of Patent: Jul. 7, 1998

[54] UPSTREAM INLET INJECTOR

[75] Inventors: Thomas L. Goldsmith, Earlville, Iowa; Lother Hartmann, Oerlinghausen, Germany

[73] Assignee: Suttner America Company, Dubuque, Iowa

[21] Appl. No.: 648,624

[22] Filed: May 16, 1996

[51] Int. Cl.$^6$ .................................................. B05B 7/26
[52] U.S. Cl. .................... 239/310; 239/581.2; 137/891; 137/892; 251/100
[58] Field of Search .......................... 239/310, 318, 239/443, 581.1, 581.2, 582.1, 583; 137/599.2, 891, 892; 251/100

[56] References Cited

U.S. PATENT DOCUMENTS

| | | | |
|---|---|---|---|
| 653,369 | 7/1900 | Webster | 137/599.2 |
| 2,345,275 | 3/1944 | Marvin | 299/84 |
| 2,916,044 | 12/1959 | Phelan et al. | 251/100 X |
| 3,139,238 | 6/1964 | Norstrud et al. | 239/310 |
| 3,188,055 | 6/1965 | Lutjens et al. | 259/4 |
| 3,229,703 | 1/1966 | Thompson et al. | 134/100 |
| 3,260,464 | 7/1966 | Harant | 239/318 |
| 3,454,042 | 7/1969 | Phillips | 137/565 |
| 3,573,862 | 4/1971 | Brown | 134/57 |
| 3,595,268 | 7/1971 | Archer | 137/565 |
| 3,595,442 | 7/1971 | Shapiro | 222/133 |
| 3,801,017 | 4/1974 | Jarzynski | 239/310 |
| 3,903,909 | 9/1975 | Noren et al. | 134/58 |
| 4,262,695 | 4/1981 | Iizumi | 137/599.2 |
| 4,294,280 | 10/1981 | Tom | 239/310 X |
| 4,391,287 | 7/1983 | Konoshima | 134/99 |
| 4,508,272 | 4/1985 | Thompson | 239/318 |
| 4,848,384 | 7/1989 | Christopher et al. | 134/57 |

Primary Examiner—Kevin P. Shaver
Assistant Examiner—Steven J. Ganey
Attorney, Agent, or Firm—Zarley, McKee, Thomte, Voorhees, & Sease

[57] ABSTRACT

An apparatus and method for injecting a chemical upstream of a pressure washer includes an injector valve comprising a housing having a passageway through which the wash stream flows. The injector is installed upstream of the pressure washer pump. A chemical inlet is formed downstream from an adjustable orifice which causes the chemical to be drawn into the passageway through the chemical inlet. The injector also includes a plunger in which the adjustable orifice is formed. By moving the plunger, the passageway can be opened or blocked allowing the chemical to be selectively injected into the wash stream.

16 Claims, 3 Drawing Sheets

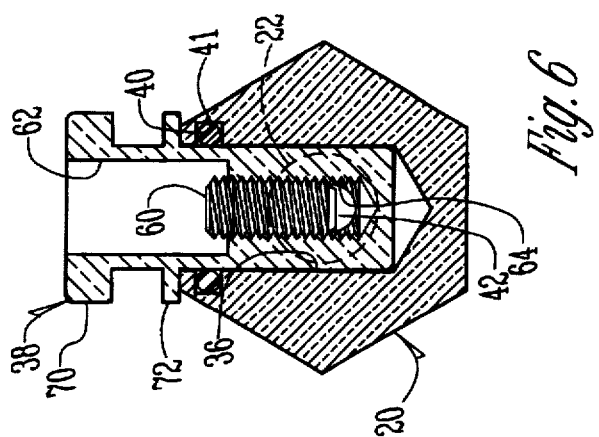
Fig.6
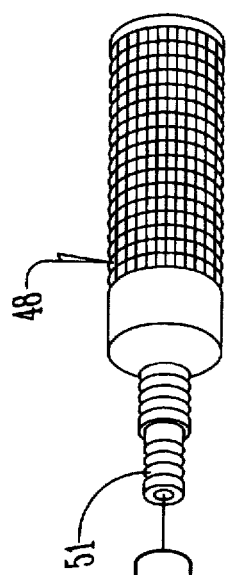
Fig.3
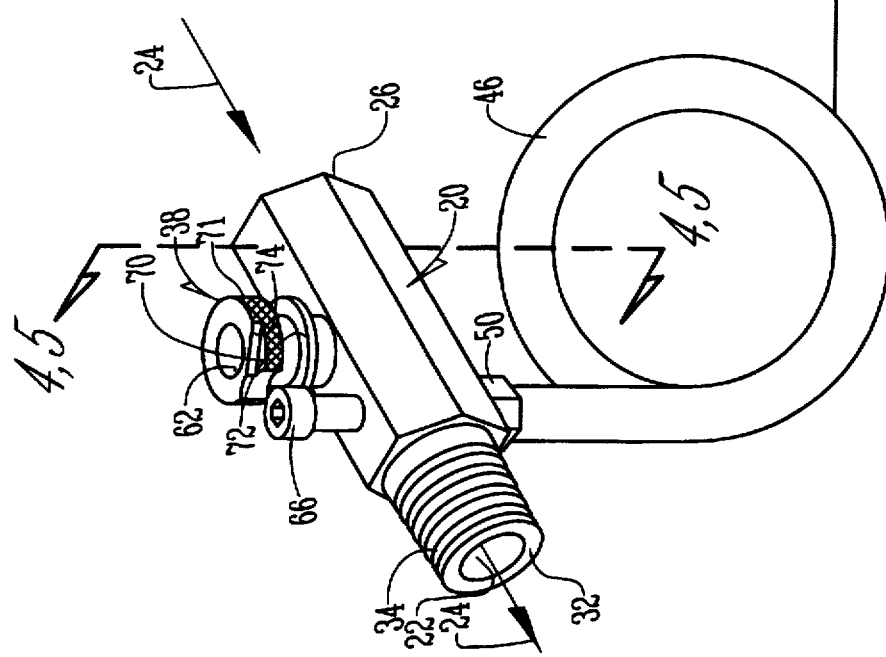

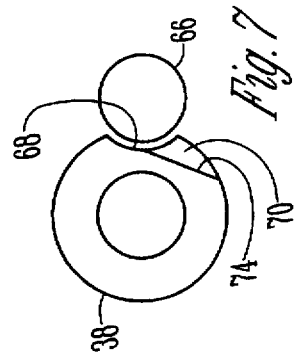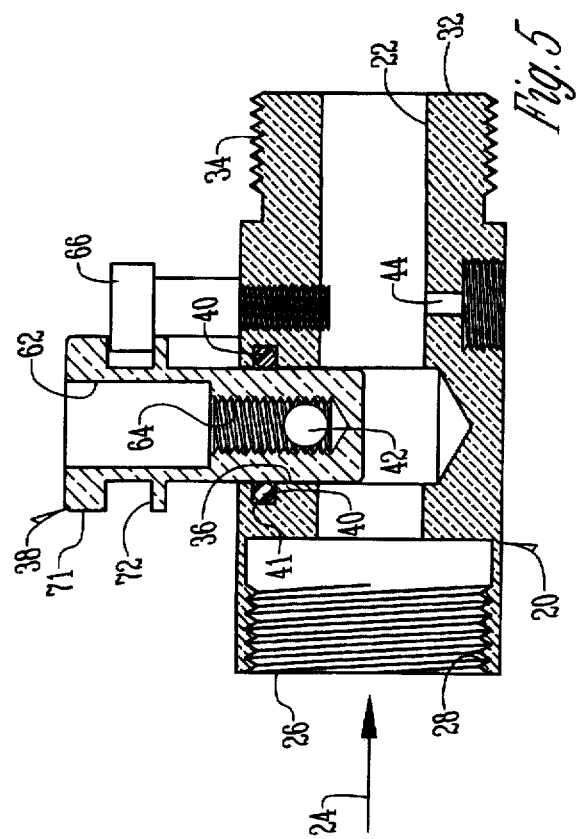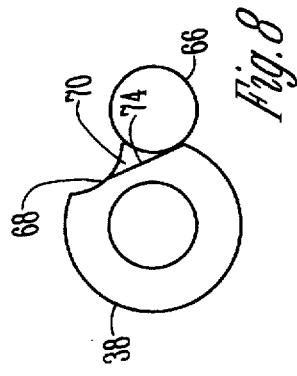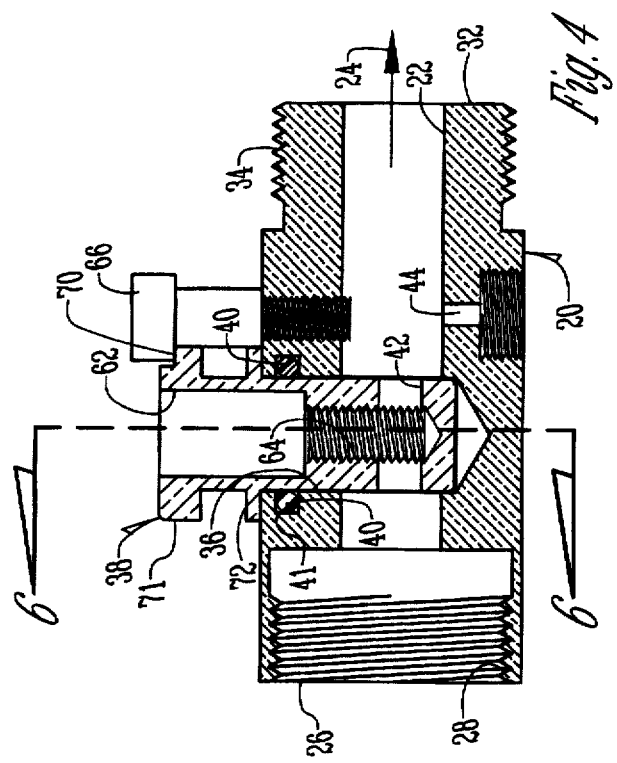

UPSTREAM INLET INJECTOR

BACKGROUND OF THE INVENTION

1. Field of the Invention

The present invention relates to washing systems. More particularly, though not exclusively, the present invention relates to an upstream inlet injector for introducing chemicals into a washing system.

2. Problems in the Art

A typical prior art pressure washer capable of injecting a detergent or other chemical into the wash line injects the chemical into the line downstream from the pressure washer pump. To draw the chemical into the wash line, a venturi is created by creating a pressure drop across an orifice in the chemical injector. To achieve this pressure drop, the restriction at the nozzle of the pressure washer is lessened by some means (e.g., a larger nozzle, a hi-lo nozzle, etc.). As a result, the chemical solution is applied with a pressure extremely lower than the normal operating pressure of the washer without the chemical introduced.

Most people that use pressure washers are accustomed to the high pressure washers found at coin operated car washes. These high pressure washers typically include separate pumps for the water and the detergent. As a result, a high pressure spray is created during the soap cycle as well as the rinse cycle. When people then use a portable high pressure washer, they are disappointed when the water having a detergent sprays out at a very low pressure compared to the pressure from the water without the detergent.

Washing systems do exist in the prior art that introduce chemicals upstream from the pump. Prior art methods for introducing the chemical upstream of the pump include using a valve and the vacuum caused by the pump, or an injector with a restrictive orifice. The valve method requires using extra plumbing and a restrictor as integral parts of the pressure washer. These prior art injectors are normally assembled as an integral part of the pressure washer and restrict the incoming water to the pump, thus often causing cavitation which damages the pump. In addition to these problems, prior art upstream injection systems cannot be attached as a simple accessory and offer no means to turn the injection of the chemical "on" or "off". Also, there is no protection from pump cavitation when the injector is not being used to draw chemicals into the wash stream.

Another problem with placing an injector upstream of the pump is that the injector cannot operate optimally over varying ranges of pump flow rates since the performance of the injector depends on the flow rate and also the dimensions and location of components of the injector which are fixed in prior art injectors. As a result, when the pump flow rate changes, the pump may cavitate or the chemical may not be introduced as desired.

Other prior art systems involve using gate valves and solenoid valves to let a detergent flow into a mixing chamber. This prior art system involves excessive complexity and increases the cost of the wash system.

OBJECTS OF THE INVENTION

A general object of the present invention is the provision of an upstream inlet injector which overcomes the deficiencies found in the prior art.

A further object of the present invention is the provision of an upstream inlet injector which uses an adjustable orifice to create a venturi which draws an appropriate amount of detergent into the wash stream upstream of the pump.

A further feature of the present invention is the provision of an upstream inlet injector which enables a user to selectively turn the injected chemical on or off.

A further feature of the present invention is the provision of an upstream inlet injector which reduces the complexity of pressure washer systems while eliminating the need for additional valves and plumbing.

Further features and advantages of the present invention include:

An upstream inlet injector which prevents cavitation to the pump by not excessively restricting the wash line flow.

An upstream inlet injector which prevents cavitation during non use of the injected chemical.

An upstream inlet injector which is capable of operating over a wide range of flow rates.

An upstream inlet injector which is adjustable for various inlet pressures and altitudes.

An upstream inlet injector which can be easily retrofitted on existing pressure washers.

These as well as other objects, features and advantages of the present invention will become apparent from the following specification and claims.

SUMMARY OF THE INVENTION

The present invention relates to a method and apparatus for injecting a chemical upstream of a pump. A chemical injector is placed upstream from a pressure washer pump. The injector includes a housing having a passageway through which a wash stream flows. A chemical inlet is formed in the housing downstream from an adjustable orifice which causes chemicals to be drawn into the passageway through the chemical inlet. The upstream inlet injector may also include a plunger which is movable between a first and second position. By moving the plunger, the passageway can be substantially opened or substantially blocked in order to control the flow of the chemical through the chemical inlet.

BRIEF DESCRIPTION OF THE DRAWINGS

FIG. 3 is a perspective view of the assembled injector of the present invention.

FIG. 4 is an enlarged cross-section taken along lines 4—4 of FIG. 3 showing the injector in an "on" position.

FIG. 5 is a sectional view similar to FIG. 4 but showing the injector in an "off" position.

FIG. 6 is an enlarged cross-section taken along line 6—6 of FIG. 4.

FIG. 7 is a top view of the plunger and shoulder bolt in the off position.

FIG. 8 is a top view of a plunger and shoulder bolt in the on position.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
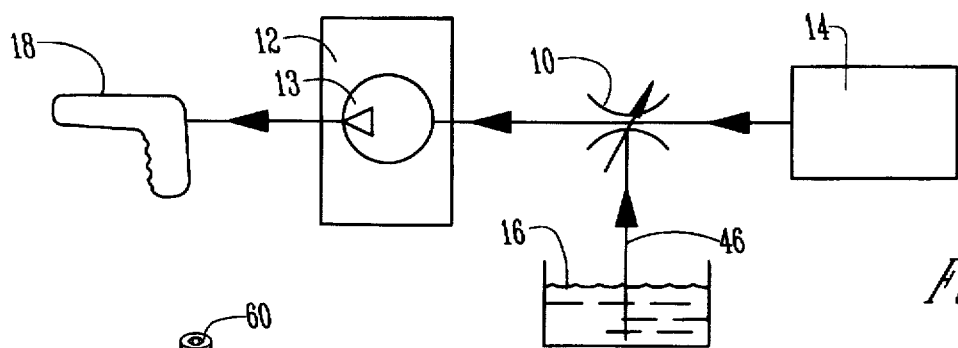
FIG. 1 is a block diagram showing a pressure washer system including an embodiment of the present invention.

FIG. 1 shows a block diagram illustrating the preferred use of the present invention. An upstream inlet injector 10 is shown in FIG. 1 connected upstream from a pressure washer 12 and downstream from the water source 14. The pressure washer 12 is conventional and includes a pump 13. A reservoir 16 holds a chemical such as detergent which is connected to the injector 10. As shown in FIG. 1, the pressure washer 12 is connected to a conventional nozzle 18 which is held by the user in order to spray a desired area with high pressure water. When the injector 10 is turned on, the water flowing from the water source 14 through the injector 10 to the pressure washer 12 draws detergent into the wash stream and is ultimately pumped by the pump 13 through the nozzle 18 along with the water providing the user with a high pressure spray including water and detergent. When the injector 10 is turned off, the pressure washer 12 and injector 10 operate in the same manner except no chemical is drawn into the wash line.

Figure 2:
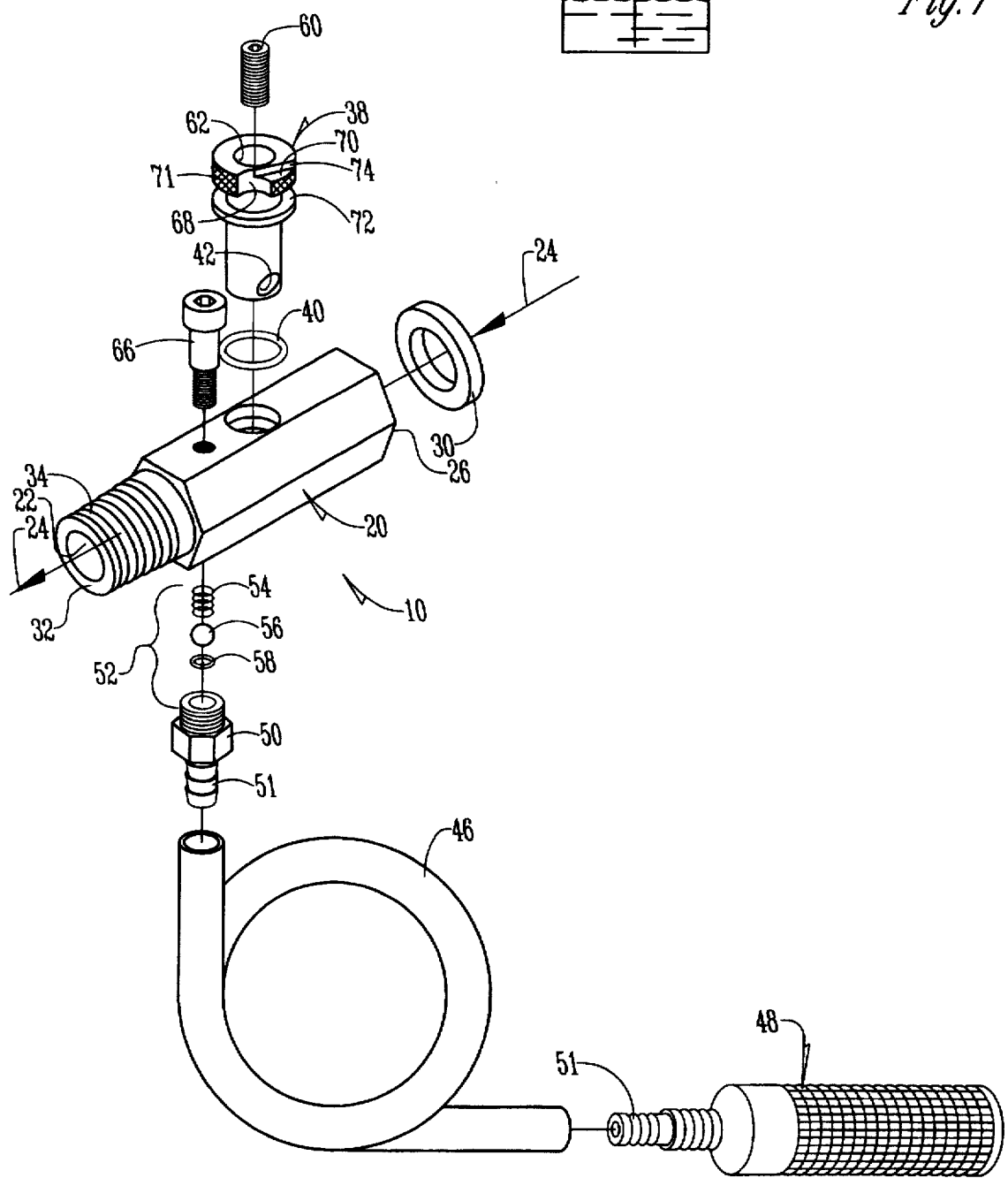
FIG. 2 is an exploded perspective view of an embodiment of the present invention.

FIG. 2 shows an exploded view of the upstream inlet injector 10. The injector 10 is comprised of a housing 20 having an axial passageway 22 formed throughout the length of the housing 20. While the injector is operating, water will flow through the passageway 22 in the direction shown by arrows 24. As shown best in FIGS. 4 and 5, the housing 20 includes an input female end 26 including female threads 28 which are adapted to threadably couple to a typical garden hose which is connected to the water source 14. A washer 30 is used to seal the connection between the garden hose and the female end 26 of the injector 10. As shown in FIGS. 4 and 5, the housing 20 includes a male output end 32 with male threads 34 which are adapted to threadably couple to the input of the pressure washer 12. In this way, the passageway 22 provides communication from the water source 14 to the pressure washer 12.

As shown best in FIGS. 2 and 4, a radially extending hole 36 is formed in the housing 20 between the ends 26 and 32. The hole 36 extends through the upper wall of the housing 20 and partially into the lower wall. A plunger 38 is adapted to be insertable into the hole 36. A rubber seal 40 is inserted into the groove 41 formed in the housing 20 in order to create a water tight seal between the hole 36 and the plunger 38. The plunger 38 is allowed to move up and down and rotate relative to the housing 20. An orifice 42 is formed near the bottom end of the plunger 38. The orifice 42 extends through the plunger 38 (FIG. 4). When the plunger is inserted into the housing 20 such that the plunger 38 blocks the passageway 22 (FIG. 4), the orifice 42 creates a venturi which draws detergent into the wash stream (discussed below).

A chemical inlet hole 44 is formed in the housing and is in communication with the passageway 22 downstream from the plunger 38. The inlet hole 44 is threadably coupled to a chemical hose 46 which is also connected to a chemical filter 48. The hose 46 is connected to the housing 20 by a threaded fitting 50 which screws into the housing 20. The hose 46 is connected to the fitting 50 and the filter 48 by sliding the hose 46 over hose barbs 51.

As shown in FIG. 2, a check valve 52 is provided in the fitting 50. The check valve 52 is comprised of a spring 54, a ball 56 and an O-ring 58. The spring 54 tends to bias the ball 56 against the O-ring 58 from the top of the O-ring. In this way, chemical from the reservoir 16 can flow from the reservoir through the check valve 52 and into the passageway 22 while fluid from the passageway 22 cannot pass through the check valve 52 to the reservoir 16.

The hose 46, filter 48, fitting 50 and the check valve 52 are conventional and do not form a part of the present invention.

The size of the orifice 42 is adjustable by turning an adjustment screw 60 mounted in the plunger 38. The plunger 38 includes a bore 62 which is formed in the plunger 38 part way through from the top of the plunger 38 (FIGS. 4–6). A smaller threaded bore 64 is formed in the plunger 38 starting at the base of the bore 62 and passing beyond the orifice 42 as shown in FIGS. 4, 5, and 6. When the adjustment screw 60 is threaded into the threaded bore 64 (FIG. 6), the size of the orifice 42 can be adjusted. For example, to reduce the size of the orifice 42 and thus the volume of fluid passing therethrough, the adjustment screw 60 is screwed down through the threaded bore 64. Conversely, when the screw is raised, the volume of fluid passing through the orifice 42 increases.

A shoulder bolt 66 screws into the housing 20 and remains unmovable once installed. The plunger 38 includes an upper shoulder 70 and a lower shoulder 72 formed near the upper end of the plunger 38. The upper shoulder 70 includes a notch 68 (FIGS. 2, 7, and 8) which when aligned with the shoulder bolt 66 allows the plunger 38 to be moved into or out of the housing 20. The lower shoulder 72 is engagable with the bolt 66 to prevent the plunger 38 from being pulled completely out of the hole 36. This is shown in FIG. 5. When the plunger 38 is in the off position (FIGS. 5 and 7) the plunger is allowed to fully rotate and is prevented from moving in or out by the upper and lower shoulders 70 and 72 and the shoulder bolt 66 except when the notch 68 is aligned with the shoulder bolt 66. When the plunger is in the on position (FIGS. 4 and 8) the plunger is allowed only to rotate a certain distance between points where the notch is aligned with the shoulder bolt 66 and where a lock surface 74 is aligned with the shoulder bolt 66 (FIG. 8). When the shoulder bolt 66 is aligned with the surface 74, the plunger 38 is prevented from being moved up from the on position shown in FIG. 4 to the off position shown in FIG. 5. In this way, the injector 10 is locked in the on position.

The upstream inlet injector 10 operates in the following manner. First, to install the upstream inlet injector 10 onto a pressure washer system, the water supply hose coming from the water source 14 is connected to the female end 26 of the injector 10. The male end 32 of the injector 10 is connected to the garden swivel fitting (not shown) leading to the pressure washer 12. With the plunger 38 in the off position (FIGS. 5 and 7) the user may turn on the water supply and operate the pressure washer 12 according to its normal operation without the addition of chemicals from reservoir 16. The plunger 38 is raised to allow water to freely flow through the passageway 22. The user can then turn the plunger 38 to line the notch 68 up with the shoulder bolt 66 (FIG. 7). A knurled or scored finger grip surface 71 formed on the plunger 38 allows the user to easily grasp the plunger. The plunger 38 can then be pressed down and turned clockwise to lock the injector 10 in the on position (FIGS. 4 and 8). With the pressure washer 12 operating and the trigger of the nozzle 18 open, and with the chemical hose 46 submerged in the reservoir 16, a typical hex wrench can be used to adjust the adjustment screw 60 by screwing the screw 60 in until the chemical is being drawn into the wash stream. Typically, after initially adjusting the adjustment screw 60, the adjustment screw 60 will not need additional adjustment unless varying elevations or inlet water pressures require a different setting. If so, the adjustment screw 60 is simply readjusted down or up for the proper setting. When the user is through using the chemical, the plunger 38 is turned to line up the notch 68 with the shoulder bolt 66. The plunger 38 is then pulled up to the off position (FIGS. 5 and 7). If desired, the user may turn the plunger in either direction to lock the plunger 38 in the off position.

FIG. 5 shows the injector 10 in the off position. In this position, the plunger 38 is pulled out of the housing 20 as far as it is allowed. As shown in FIG. 5, the passageway 22 is nearly unobstructed by the plunger 38. As a result, there is no venturi effect and no chemical will be drawn into the passageway 22 through the chemical inlet hole 44. Also, the flow of fluid through the passageway 22 will not enter the chemical reservoir 16 as a result of the check valve 52.

To move the plunger 38 between the on and off position, the notch 68 formed in the upper shoulder 70 of the plunger 38 must be aligned with the shoulder bolt 66. By pressing the plunger 38 down into the housing 20, the injector 10 is moved to the on position. Once the plunger 38 is pressed into the housing 20, it is rotated clockwise to the position shown in FIG. 8, thus aligning the surface 74 with the shoulder bolt 66, and locking the plunger into the on position. By rotating the plunger 38, the orifice 42 is also aligned parallel to the passageway 22 as shown in FIGS. 4 and 6. In the on position, as the water flows through the passageway 22 in a direction shown by arrows 24, a pressure drop is experienced immediately downstream from the orifice 42. This pressure drop (a venturi effect) causes chemicals to be drawn into the passageway 22 through the chemical inlet hole 44. In addition, the restriction caused by the plunger 38 in the passageway 22 also causes chemicals to be drawn into the passageway because of the vacuum from the pump 13. As a result, the fluid downstream from the injector 10 will be comprised of a mixture of water and the chemical from the reservoir 16.

By turning the adjustment screw 60, the size of the orifice 42 can be adjusted. This allows for the optimum operation of the injector 10 which avoids cavitation to the pump 13 of the pressure washer 12. The injector 10 is also then capable of turning on or off the supply of chemical to the wash stream. In addition, the orifice 42 can be adjusted to compensate for differences in flow rates resulting from different water pressures, different elevations, etc.

Since the upstream inlet injector 10 is self-contained in a single unit, the injector 10 can be easily retrofitted into an existing pressure washer system as well as included with new pressure washers.

Although the present invention will operate in various embodiments, the preferred injector 10 is designed to fit a standard pressure washer having a ¾ inch or ½ inch inlet connection. The preferred injector 10 is comprised of brass with a steel shoulder bolt 66 and adjustment screw 60.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An upstream inlet injector for use with a pressure washer having a pump, a fluid source, and a chemical source, the injector comprising:
  a housing having first and second ends with a passageway formed through the housing between the first and second ends, the first end being operatively attachable to the fluid source, the second end being operatively attachable to the pump on an upstream side thereof;
  a chemical inlet formed in the housing between the first and second ends, the chemical inlet being in communication with the passageway and operatively attachable to the chemical source;
  a movable body coupled to the housing, the body having an adjustable orifice formed in the body, the body being movable between a first position restricting the flow of fluid through the passageway by blocking the passageway except for the orifice, and a second position allowing full flow of fluid through the passageway, wherein the flow of fluid through the passageway in the first position is determined by the size of the orifice, wherein the size of the orifice is adjustable to provide a substantially infinite number of orifice sizes;
  wherein the flow of fluid through the adjustable orifice creates a venturi causing chemicals to be drawn into the passageway through the chemical inlet when fluid flows through the passageway.

2. The upstream inlet injector of claim 1 wherein the orifice is adjusted by turning a screw passing at least partially through the orifice.

3. The upstream inlet injector of claim 1 wherein the movable body is rotatable in relation to the housing.

4. The upstream inlet injector of claim 1 wherein the movable body is slidable with respect to the housing.

5. The upstream inlet injector of claim 1 wherein the movable body is comprised of a plunger slidably and rotatably coupled to the housing.

6. The upstream inlet injector of claim 5 wherein the plunger moves between an on position and off position.

7. The upstream inlet injector of claim 6 wherein the plunger includes a locking member to lock the plunger in the on position.

8. The upstream inlet injector of claim 6 further comprising a shoulder member coupled to the housing adjacent the plunger, wherein the plunger includes a notch which allows the plunger to move between the on and off positions only when the notch is aligned with the shoulder member.

9. The upstream inlet injector of claim 6 further comprising:
  first and second shoulders formed on the plunger, the first and second shoulders being axially spaced from each other with the second shoulder being positioned between the first shoulder and the orifice;
  a notch formed in the first shoulder; and
  a shaft extending from the housing and having an enlarged end, wherein the plunger can move between the on and off positions only when the notch is aligned with the enlarged end of the retainer.

10. The upstream inlet injector of claim 9 wherein the enlarged end of the retainer retains the plunger in the housing by engaging the second shoulder.

11. An upstream inlet injector for use with a pressure washer having a pump comprising:
  a housing having first and second ends with a passageway formed through the housing from the first end to the second end, the first end being attachable to a source of fluid, the second end being attachable to the pressure washer upstream from the pressure washer pump;
  a chemical inlet formed in the housing between the first and second ends;
  a plunger coupled to the housing between the first end and the chemical inlet, the plunger being movable between a first and second position, the plunger substantially blocking the passageway in the first position, and leaving the passageway substantially open in the second position;
  an orifice formed in the plunger for causing chemicals to be drawn into the passageway through the chemical inlet when the plunger is in the first position and fluid is flowing through the passageway; and an adjustment member movably coupled to the plunger for adjusting the size of the orifice by partially blocking the orifice.

12. The upstream inlet injector of claim 11 wherein the adjustment member is comprised of a rotatable adjustment screw, wherein the adjustment screw can be rotated to extend into the orifice, defining a variable size of the orifice.

13. A method of injecting a chemical into water in a washing system comprising the steps of:

providing a pressure washer having a pump;

connecting a source of water to the pump to create a water path between the source of water and the pump;

providing a housing between the source of water and the pump;

providing an adjustable orifice in the housing, wherein the adjustable orifice is formed in a movable body such that the adjustable orifice can be selectively placed in and out of the water path by moving the movable body;

introducing a chemical into the water upstream from the pump by placing the orifice in the water path; and adjusting the size of the orifice while in the water path to control the flow of water and chemical to the pump.

14. The method of claim 13 further comprising adjusting the orientation of the orifice to further control injection of chemicals into the water.

15. An upstream chemical injector for use with a pressure washer having a pump connectable to a water source, the injector comprising:

an elongated housing adapted to be installed in a fluid line upstream from the pump;

the housing having an axial passageway extending therethrough, a transverse bore, and a chemical inlet downstream from the bore, the chemical inlet being fluidly attachable to a chemical source;

a plunger movably mounted in the bore so as to control the flow of chemicals through the chemical inlet; and an orifice formed in the plunger having a size that can be selectively adjusted by a user, wherein the orifice moves in and out of the axial passageway when the plunger is moved.

16. The injection of claim 15 wherein the plunger includes an adjustable screw extendible into the orifice to adjust the volume of fluid flow through the orifice.

* * * * *